US006808471B1

(12) United States Patent
Bauerle et al.

(10) Patent No.: US 6,808,471 B1
(45) Date of Patent: Oct. 26, 2004

(54) METHODS AND APPARATUS FOR PROVIDING SECURITY FOR ELECTRONICALLY-CONTROLLED CYLINDER ACTIVATION AND DEACTIVATION

(75) Inventors: Paul A. Bauerle, Fenton, MI (US); Mark H. Costin, Bloomfield Township, MI (US); Donovan L. Dibble, Utica, MI (US); Kerfegar K. Katrak, Fenton, MI (US); Vivek Mehta, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/431,698

(22) Filed: May 8, 2003

(51) Int. Cl.[7] .......... B60K 41/04

(52) U.S. Cl. .......... 477/107; 123/481

(58) Field of Search .......... 477/107; 123/198 F, 123/332, 376, 403, 406.52, 481

(56) References Cited

U.S. PATENT DOCUMENTS 6,687,603 B2 * 2/2004 Wakashiro et al. .......... 701/110
6,688,282 B1 * 2/2004 Okubo et al. .......... 123/339.11
6,739,314 B1 * 5/2004 Bauerle et al. .......... 123/396

FOREIGN PATENT DOCUMENTS

EP 0 659 991 * 6/1995
EP 1 232 896 * 8/2002

* cited by examiner

*Primary Examiner*—Ha Ho
(74) *Attorney, Agent, or Firm*—Christopher DeVries

(57) ABSTRACT

Methods and apparatus are provided for ensuring that a throttle increase accompanying a change in the number of active cylinders of an internal combustion engine will not occur too long with more than a selected fraction of all the cylinders activated, so as to not startle a driver. The apparatus comprises an electronic controller that generates the throttle increase if less than all the cylinders are requested to be activated. A determination is made as to whether the number of cylinders being fueled is equal to or less than the selected fraction. A timer is started if the number of cylinders being fueled is greater than the selected fraction. The throttle increase is turned off if the amount of time measured by the timer exceeds a threshold before the number of cylinders being fueled becomes either less than or equal to the selected fraction.

20 Claims, 4 Drawing Sheets

METHODS AND APPARATUS FOR PROVIDING SECURITY FOR ELECTRONICALLY-CONTROLLED CYLINDER ACTIVATION AND DEACTIVATION

FIELD OF THE INVENTION

The present invention generally relates to electronic throttle security, and more particularly relates to such security for internal combustion engines having electronic throttle control systems for enabling cylinder activation and deactivation.

BACKGROUND OF THE INVENTION

Those skilled in the art of internal combustion engine design understand that control of internal combustion engines preferably includes engine cylinder activation and deactivation or displacement on demand to improve fuel economy. This engine control strategy generally involves reducing the number of active engine cylinders as a reduced amount of power is requested from the engine, and the valves of deactivated cylinders are generally configured to improve fuel efficiency. For example, the valves of the deactivated cylinders are at least substantially closed to reduce pumping losses. However, in this example, after some of the cylinders are at least substantially closed to reduce pumping losses, the remaining active cylinders are generally configured to receive a throttle increase to maintain the same level of output torque from the engine. Furthermore, when the power requirements increase a sufficient amount, the deactivated cylinders are reactivated and the throttle level is altered so that the engine continues to deliver the desired amount of power.

It is desirable for the adjustments of the control strategy to occur with minimal, and preferably no awareness of the engine operator. This statement is particularly true in the case of an automobile engine operating under the control of an operator that is providing a substantially constant accelerator pedal position. In this situation, the engine throttle is preferably adjusted a predetermined amount in response to cylinder deactivation and preferably adjusted a predetermined amount in response to cylinder reactivation. While these control strategies for internal combustion engines provide the proper engine power and improve fuel efficiency, other improvements are continually sought.

In view of the foregoing, it should be appreciated that there is a need to provide methods and apparatus for providing security for electronically controlled cylinder activation and deactivation. Furthermore, other desirable features and characteristics of the present invention will become apparent from the subsequent detailed description of the invention, brief summary of the invention, abstract, and appended claims, taken in conjunction with the accompanying drawings and this background of the invention of the invention.

BRIEF SUMMARY OF THE INVENTION

In accordance with the teachings of the present invention security methods and apparatus are provided for ensuring that a throttle increase accompanying a decrease in the number of active cylinders of an internal combustion engine will be limited to a predetermined threshold period with more than a selected fraction of all the cylinders of the engine being activated. The apparatus comprises an electronic controller that generates the throttle increase if less than all the cylinders are requested to be activated. A query is made to determine if the number of cylinders being fueled is equal to or less than the selected fraction. A timer is started if the number of cylinders being fueled is greater than the selected fraction of all the cylinders. The throttle increase is turned off if the amount of time measured by the timer exceeds the predetermined threshold before the number of cylinders being fueled becomes either less than or equal to the selected fraction.

BRIEF DESCRIPTION OF THE DRAWINGS

The present invention will hereinafter be described in conjunction with the appended drawing figures, wherein like reference numbers denote like elements.

DETAILED DESCRIPTION OF THE INVENTION

The following detailed description is merely exemplary in nature and is not intended to limit the invention or the application and uses of the invention. Furthermore, there is no intention to be bound by any theory presented in the preceding background of the invention or the following detailed description.

Figure 1:
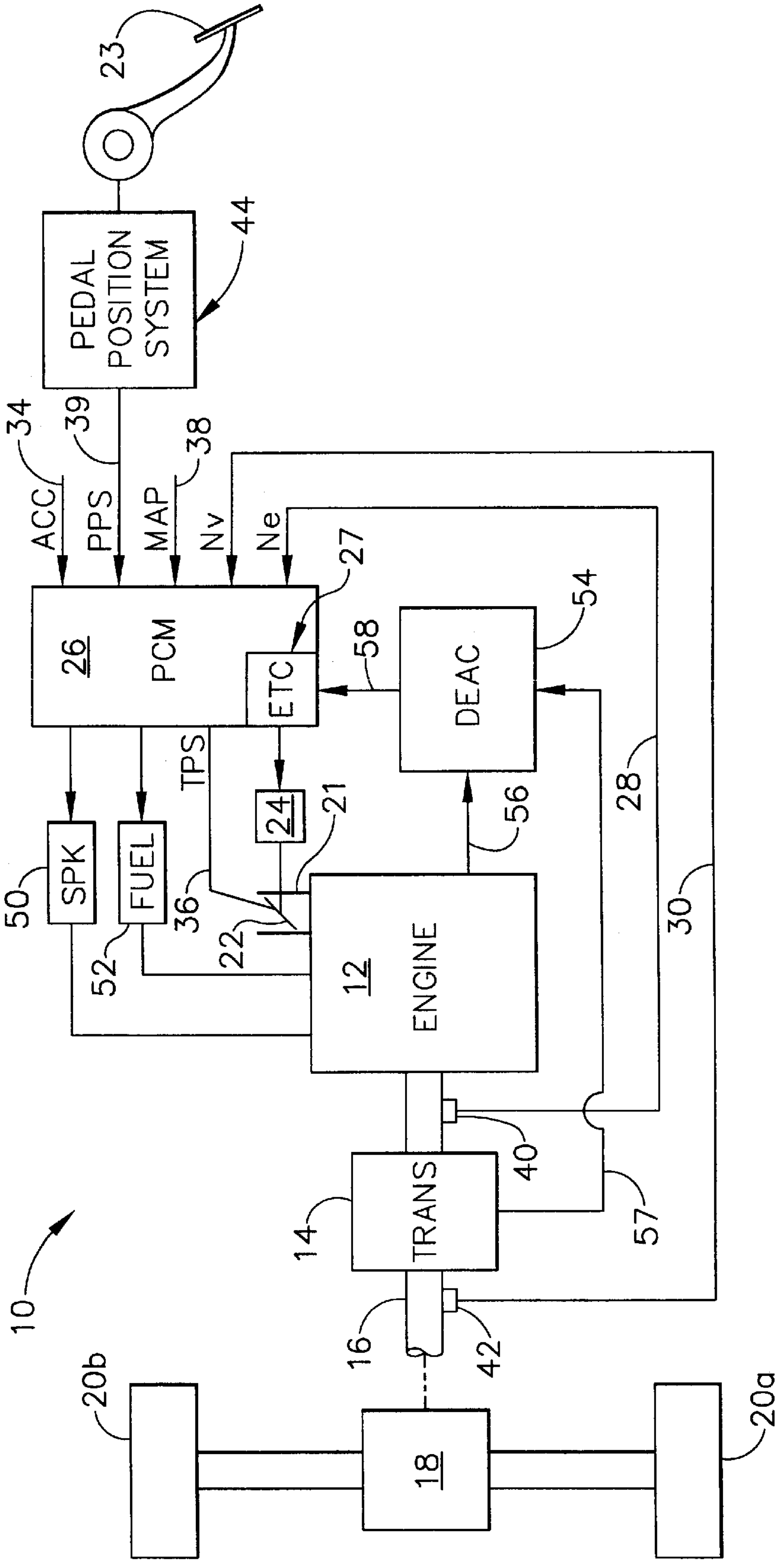
FIG. 1 is a schematic diagram of a vehicle drive train having a security system for cylinder deactivation and reactivation.

Referring to FIG. 1, a vehicle drive train 10 is generally illustrated that includes an internal combustion engine 12 coupled to transmission 14, which in turn is coupled by drive shaft 16 and differential 18 to a pair of driven wheels 20_a_–20_b_. The position of a throttle 22 disposed within a manifold 21 of engine 12 is controlled to enable engine 12 to produce the desired output torque for driving wheels 20_a_–20_b_. In the illustrated embodiment, throttle 22 is mechanically de-coupled from driver accelerator pedal 23 and instead is positioned by electric motor 24 under the direction of powertrain control module (PCM) 26 that also controls the operation of engine 12 and transmission 14. PCM 26 includes electronic throttle control (ETC) 27 for operating throttle 22. ETC 27 provides signals to motor 24. PCM 26 is microprocessor based and includes various logic units and memories such as ROM and RAM.

PCM 26 operates in response to a number of inputs. These inputs include an engine speed signal (Ne) on line 28, a vehicle speed signal (Nv) on line 30, an accessory loading signal (ACC) on line 34, a Throttle Position Feedback signal (TPS) on line 36, a Manifold Absolute Pressure (MAP) signal on line 38 and Pedal Position Sensor signal (PPS) on line 39. These inputs are provided by conventional sensors such as illustrated shaft speed sensors 40, 42 and accelerator pedal position sensor 44. In general, ETC module 27 activates motor 24 to position throttle 22 in response to the positioning of accelerator pedal 23, but various other functions such as idle speed control, engine governor control, cruise control and torque reduction are also provided for providing the ETC function in a known manner. Additionally, PCM 26 controls conventional spark control device 50 and other fuel control device 52, which are coupled to engine 12.

More specifically, internal combustion engine 12 utilizes the PCM/ETC functions provided by system 26 to adjust the fuel, the spark and the amount of airflow through intake manifold 21 in response to sensor monitored operator variations of accelerator pedal 23. Operator throttle adjustment is typically accomplished using an accelerator-input mechanism, such as a foot pedal 23, joystick, hand pedal, lever or track ball. The input mechanism is mechanically coupled to sensors in block 44 that in turn provide PPS control signals having magnitudes indicative of the accelerator position to the ETC module 27. In response, PCM 26 generates additional electrical control signals for enabling the hardware of the vehicle engine to provide the desired operating level requested by the driver as indicated by the accelerator-input mechanism 23. Such ETC systems provide numerous advantages such as reduced costs, improved simplicity, engine noise reduction, throttle command conditioning for emissions reduction, and/or torque based control functions.

DEAC system 54 provides cylinder activation, deactivation and reactivation to improve a number of operating parameters, such as fuel economy. This is generally accomplished by shutting off or deactivating a predetermined number of the cylinders of engine 12 when the power requirements of the engine are at or below a predetermined lower power level (i.e., the power level is too low) and reactivating the cylinders when the power requirements sufficiently are at or exceed a predetermined upper power level. As can be appreciated by those of ordinary skill in the art, the predetermined power levels can be determined according to any number of techniques. Ideally, the operator of engine 12 or driver of a vehicle including engine 12 is not aware of these transitions. Engine 12 has a predetermined number of cylinders and a selected fraction of this number is operated when deactivation reaches a steady state. For instance, if engine 12 has eight cylinders, which is a well known V8 configuration, and the fraction is one half, then engine 12 could be operated on all eight cylinders when the need for power is high (i.e., the power level is at or exceeds the predetermined upper power level). In addition, the engine 12 could transition to eventually operate on only four cylinders when the need for power is sufficiently low (i.e., at or below the predetermined low level). Engine 12 could also have twelve cylinders. In this case, engine 12 could run on eight, six or four cylinders depending on the power demand requirements, for instance. In any event, the valves of any deactivated cylinders are at least partially closed and preferably completely closed.

DEAC system 54 is coupled to monitor engine 12 and transmission 14 through respective lines 56 and 57 to enable DEAC 54 to provide control signals to PCM 26 through line 58. When some of the cylinders of engine 12 are shut off, the other active cylinders of the engine are run in response to a higher opening of throttle 22 referred to herein as THROTTLE OFFSET. This action maintains substantially the same level of output torque being delivered through transmission 14 and differential 18 to wheels 20*a* and 20*b*. It is desirable for the larger opening of throttle 22 to occur with minimal and preferably, no action or even awareness by the operator of the engine of the cylinder deactivation event. In addition, it is desirable for the operator to have minimal awareness of cylinder reactivations. To ensure a seamless transition, throttle 22 should be opened at a time slightly before the cylinders are in a deactivated mode. The system preferably avoids the opening of throttle 22 to provide the THROTTLE OFFSET without verification that fuel is shut off to at least some of the cylinders.

Engine 12 could have any number of cylinders greater than one. For purposes of illustration, engine 12 is assumed the aforementioned V8, which is operated on four cylinders when conditions are correct for cylinder deactivation. DEAC 54 provides the THROTTLE OFFSET during the time the cylinder deactivation logic is requesting the throttle to be opened, but the THROTTLE OFFSET is allowed to continue if half or less of the fuel injectors are disabled before a predetermined threshold period (or time limit threshold) is met or exceeded.

Figure 2:
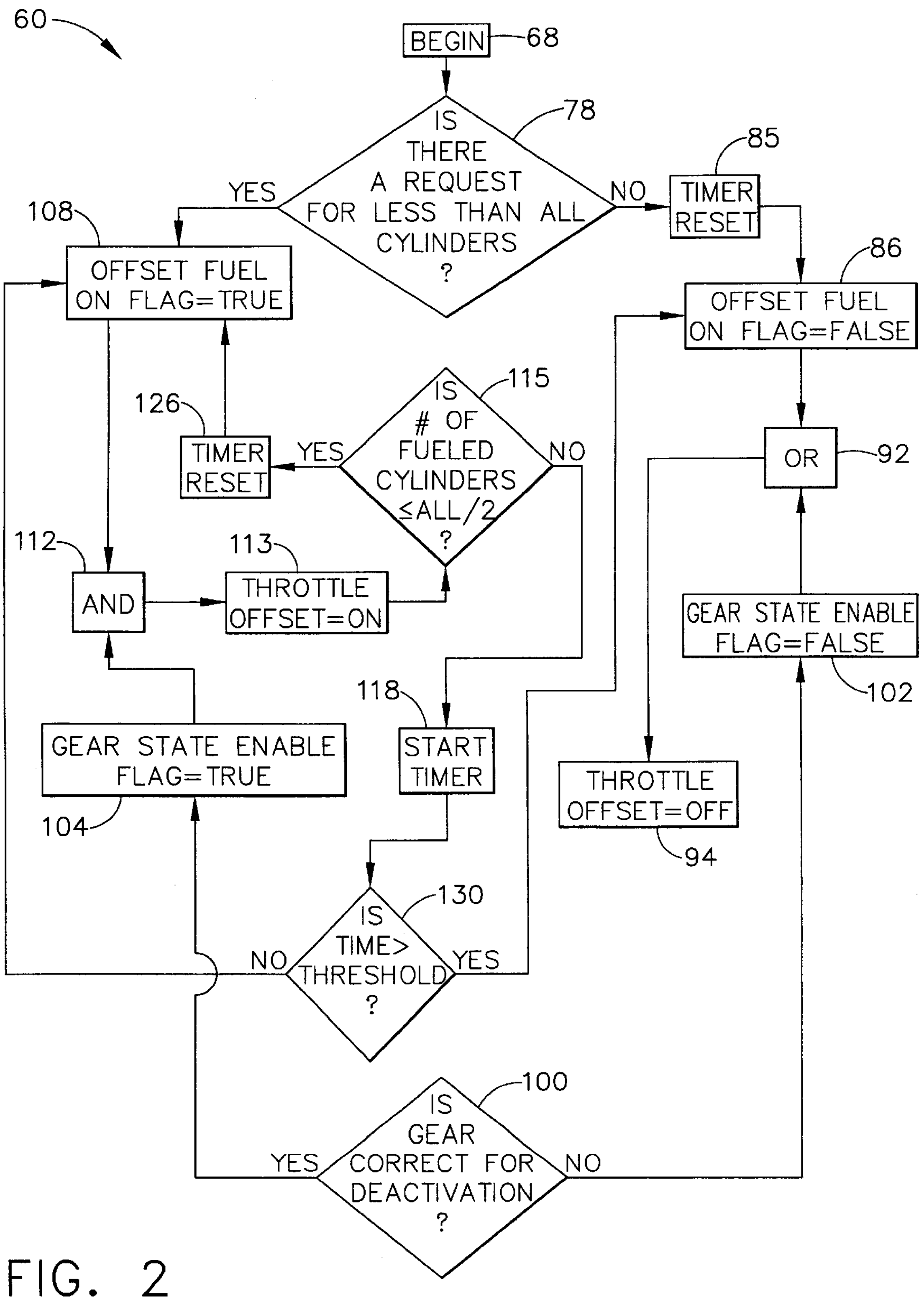
FIG. 2 is a flow chart of a software program for use with the system of FIG. 1 in accordance with an embodiment of the invention.
Figure 3:
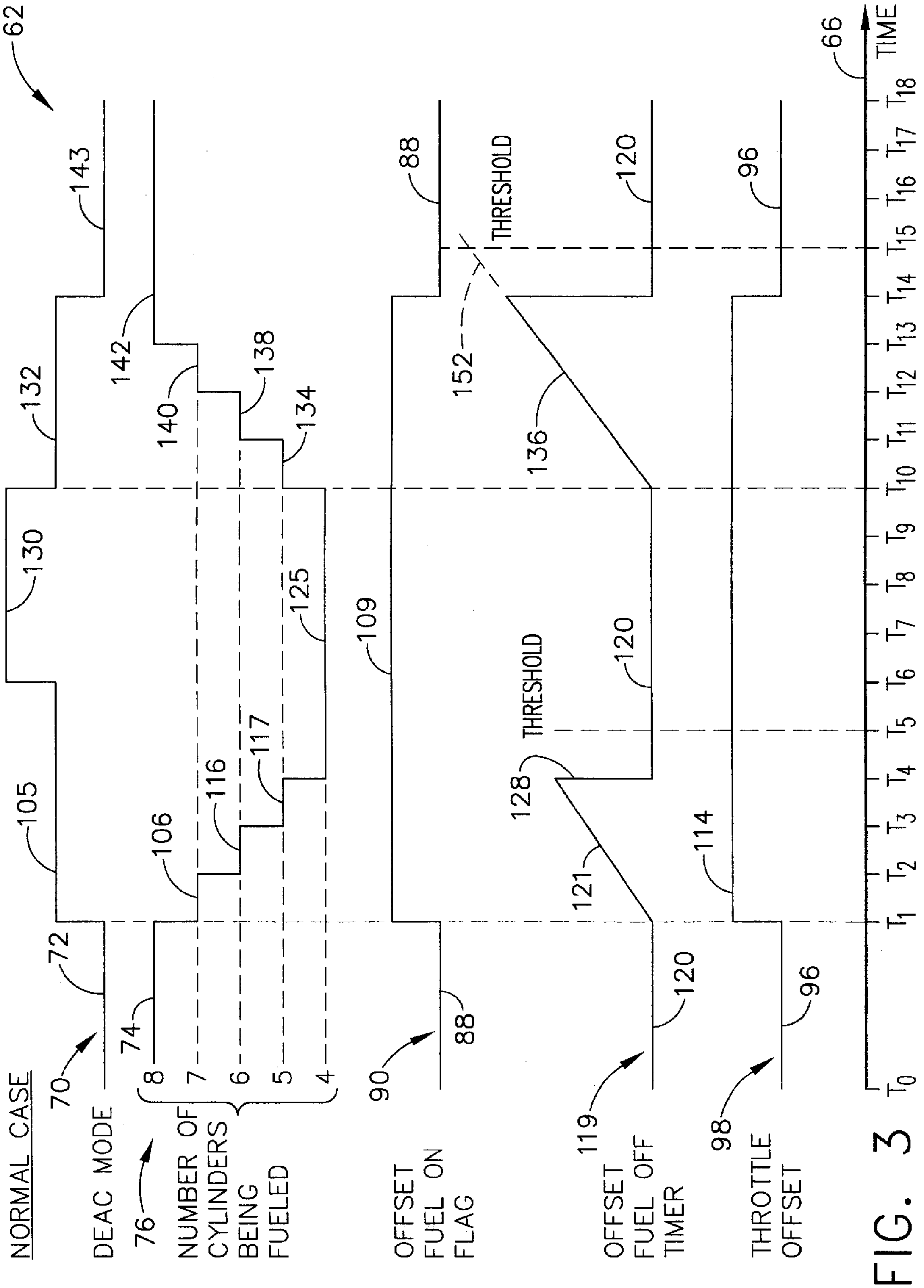
FIG. 3 is a timing diagram indicating a normal mode of operation of the security system of FIGS. 1 and 2.
Figure 4:
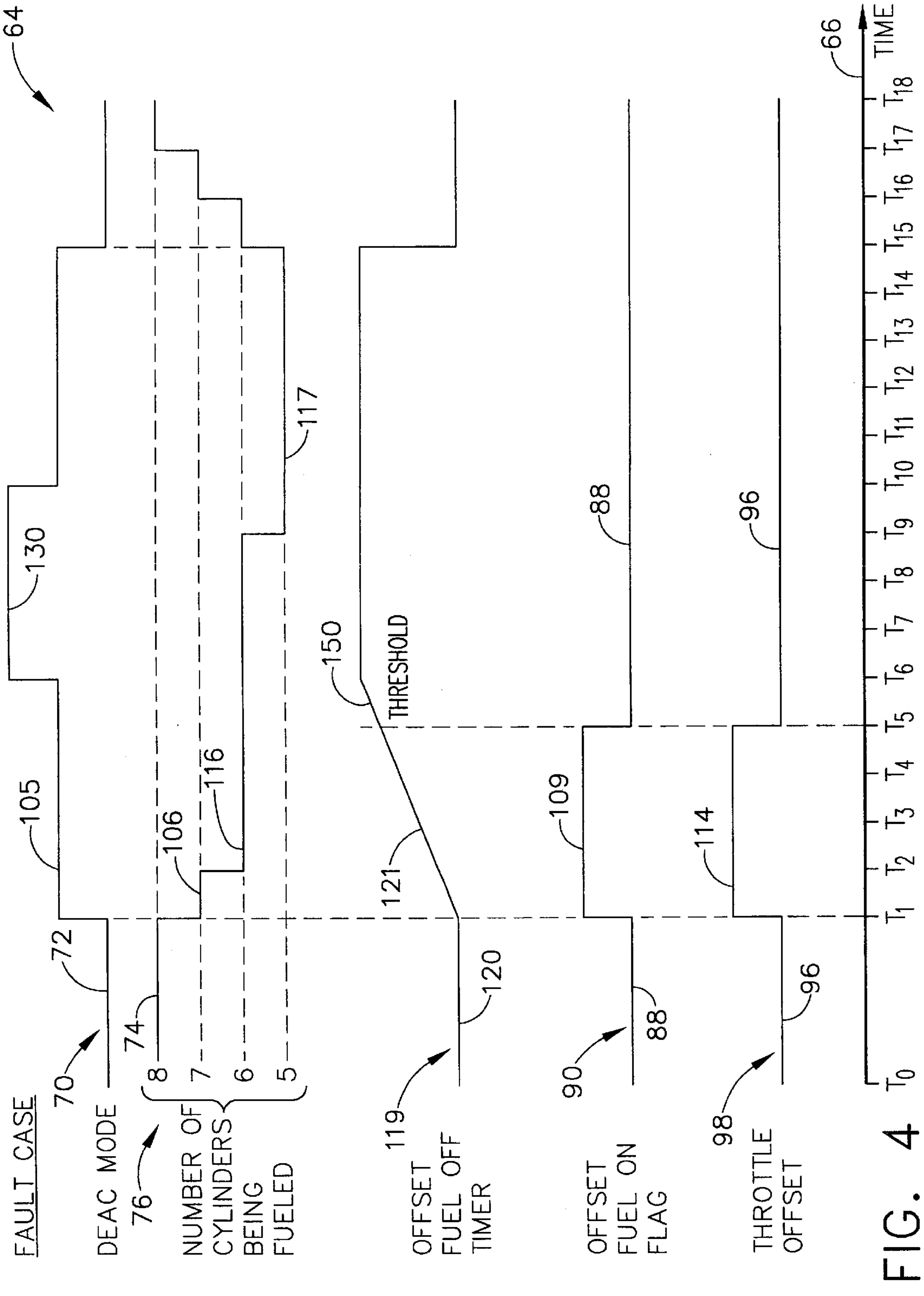
FIG. 4 is a timing diagram indicating a fault mode of operation of the security system of FIGS. 1 and 2.

Referring to FIG. 2, a method 60 is illustrated that is preferably conducted by the PCM 26. However, the method can be conducted by other electronic controllers, individually or in combination. The timing diagrams 62 and 64 respectively of FIG. 3 and FIG. 4 illustrate the operation of apparatus 10 of FIG. 1 and method 60 of FIG. 2 Abscissa axis 66 of FIG. 3 is the time between times T0 and T18. Time, TO on axis 66 corresponds to BEGIN step 68 of method 60.

DEAC MODE REQUEST graph 70 of FIG. 3 is initially assumed to be requesting that all eight cylinders receive fuel as indicated by level 72. Accordingly, eight cylinders are being fueled between times T0 and T1 as indicated by level 74 of graph 76 which indicates the NUMBER OF CYLINDERS BEING FUELED. Decision block or method step 78 of FIG. 2 determines if DEAC 54 is requesting activation of less than all the cylinders. Since the answer is NO between T0 and T1, the TIMER is RESET as indicated by block 85. Accordingly, OFFSET FUEL ON FLAG 86 is FALSE as indicated by block 86 of FIG. 2 and level 88 of OFFSET FUEL ON FLAG waveform 90 of FIG. 3. OR block 92 of FIG. 2 responds to FALSE level 88 to ensure that the THROTTLE OFFSET is OFF per block 94 to provide level 96 of THROTTLE OFFSET waveform 98 of FIG. 3. Hence, engine 12 does not receive the THROTTLE OFFSET fuel increase between T0 and T1.

Referring to FIG.1, DEAC 54 receives input on line 57 identifying which gear is being employed in transmission 14. Deactivation of any of the cylinders is not desirable if transmission 14 is in a predetermined lower gear or a predetermined set of lower gears (i.e., the gear or gears is too low), such as either the first or the second gear, for instance. If the gear is too low for cylinder deactivation to be desirable, then the NO decision from block 100 of FIG. 2 causes block 102 to provide a GEAR STATE ENABLE FLAG having a FALSE indication to OR block 92. This causes the THROTTLE OFFSET request to be OFF as indicated by block 94. Alternatively, if the gear is a gear other than the predetermined lower gear or gears, then the YES from decision block 100 causes the GEAR STATE ENABLE FLAG to be TRUE as indicated by block 104 of FIG. 2. For purposes of the following discussion herein, it is assumed that the gear level is correct for deactivation resulting in the TRUE GEAR STATE ENABLE FLAG of block 104.

At time T1 of FIG. 3, DEAC 54 requests deactivation of half of the predetermined maximum number of cylinders as indicated by level 105 of waveform 70. The number of cylinders being fueled then transitions from eight to seven as indicated by level 106 of waveform 76 of FIG. 3. Accordingly, decision step 78 of FIG. 2 now provides a YES. As a result, the OFFSET FUEL ON FLAG is TRUE as indicated by block 108 and level 109 of waveform 90. AND block 112 responds to the TRUE from block 108 and the TRUE from block 104 to provide the THROTTLE OFFSET ON SIGNAL of block 113 as indicated by level 114 of waveform 98 of FIG. 3. Level 114 results in an increased amount of fuel being supplied to the active cylinders.

THROTTLE OFFSET ON signal 114 of block 113 of FIG. 2 initiates the decision step of block 115 which determines if the number of fueled cylinders is less than or equal to one half the number of all the cylinders, for instance. Since seven, six and five as indicated by respective levels 106, 116 and 117 of waveform 76 of FIG. 3 are all greater than four the answer to decision 115 is NO between times T1 and T4. Accordingly, the START TIMER signal of block 118 causes OFFSET FUEL OFF TIMER waveform 119 to ramp from reset level 120 to begin measuring time from T1 as indicated by ramp 121 of waveform 119.

At time T4, the number of cylinders being fueled equals four as indicated by level 125 of waveform 76. Accordingly, the decision from block 115 becomes YES which RESETS the TIMER as indicated by block 126 of FIG. 2 to cause transition 128 of waveform 119 back to reset level 120. The amount of time from T1 to T4 is less than a predetermined or selected THRESHOLD amount of time (i.e., the predetermined threshold period), T5. Hence, the answer of decision block 130 is NO which allows the OFFSET FUEL ON FLAG to continue to be TRUE as indicated by block 108. The above sequence of events represents the "normal case" for the operation of the DEAC function. The THRESHOLD time, T5 may be calibrated or changed in response to monitored parameters.

At time T6 of FIG. 3, DEAC MODE signal 70 changes to and remains at level 130 to facilitate operation in the steady state four cylinder active condition until time T10 when signal 70 moves to level 132 to indicate a request for reactivation of an additional cylinder. Since activation of all cylinders is not being requested at T10, decision block 78 provides a YES so that the OFFSET FUEL ON FLAG continues to be TRUE resulting in THROTTLE OFFSET signal 98 remaining at level 114. Five cylinders are being fueled between T10 and T11 as indicated by level 134 of waveform 76. Accordingly, at T10 decision block 115 provides a NO which again provides the START TIMER signal of block 118 and waveform 119 begins ramp 136. Six, seven and eight cylinders are respectively reactivated at T11, T12 and T13 as indicated by respective levels 138, 140 and 142 of waveform 76.

At T14, the system returns to the reactivated eight-cylinder mode as indicated by level 143 of DEAC signal 70. As a result, decision block 78 becomes NO which causes the TIMER to RESET to level 120 of waveform 119 per block 85. The NO from block 78 also initiates the FALSE OFFSET FUEL ON FLAG of block 86 which causes waveform 90 to return to level 88. Accordingly, the THROTTLE OFFSET OFF signal of block 94 causes signal the THROTTLE OFFSET 98 to return to level 96. Such reactivation occurs is another "normal case" of operation for the DEAC function.

FIG. 4 illustrates a "fault case" for the DEAC function which employs the previously mentioned security method and apparatus. Between T0 and T3, the waveforms of FIG. 4 are the same as in FIG. 3 indicating the same method as previously described for FIG. 2. However, at T3 waveform 76 representing the number of cylinders being fueled undesirably remains at six cylinders as indicated by level 116 rather than dropping to five cylinders. Accordingly, system 10 is now operating in the abnormal or fault mode. Since the NUMBER OF FUELED CYLINDERS does not become equal to or less than four, TIMER RESET 126 of FIG. 2 is not enabled by decision block 115. Thus, OFFSET FUEL OFF TIMER waveform 119 portion 150 of FIG. 4 continues to ramp through the time THRESHOLD T5. As a result, decision block 130 provides a YES which enables the FALSE FUEL ON ENABLE FLAG of block 86 which causes signal 90 to drop to level 88 at T5. As a result, the THROTTLE OFFSET 98 returns to level 96 at T5 to remove the extra fuel being applied to the activated cylinders of engine 112.

Furthermore, referring again to FIG. 3, if only seven cylinders are reactivated during the reactivation sequence, then ramp 136 of waveform 119 would continue on to form dashed portion 152 which would cross time THRESHOLD T15. This event also would result in a YES from decision block 130 causing the OFFSET FUEL ON FLAG to become FALSE and the THROTTLE OFFSET also becoming FALSE. Hence, the extra fuel would again be terminated.

The previously described embodiments of the invention therefore provide a security apparatus and method which ensure that the higher THROTTLE OFFSET fuel level 114 will not be used for a long enough time with more than a selected fraction of the predetermined maximum number of cylinders. For instance, the invention provides security to ensure that THROTTLE OFFSET 98 is not allowed to remain on at level 114 long enough with more than half of the cylinders enabled.

While the exemplary embodiments have been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the spirit and scope of the invention as set forth in the appended claims.

What is claimed is:

1. A security apparatus for an electronic fuel control system in an engine of a vehicle, such apparatus comprising:

a predetermined number of cylinders of the engine that are configured for activation and deactivation;

a throttle of the engine that is configured to provide a throttle increase based at least in part upon a deactivation of one or more of said predetermined number of cylinders; and an electronic controller that is configured to:

generate an increase signal for said throttle if less than all the predetermined number of cylinders is requested to be activated;

determine whether a number of said predetermined number of cylinders being activated is equal to or less than a selected fraction;

start timing with a timer if the number of said predetermined number of cylinders being activated is greater than the selected fraction; and request termination of said increase signal if the time measured by the timer exceeds a predetermined threshold.

2. The apparatus of claim 1 wherein the electronic fuel control system further comprising:

means for adjusting said throttle; and a cylinder activation and deactivation system coupled to said means for adjusting said throttle.

3. The apparatus of claim 2 being included in a mechanical system having a transmission with a plurality of gears;

said cylinder activation and deactivation system being arranged to monitor which of said plurality of gears is being employed by said transmission; and said cylinder activation and deactivation system ensuring that said increase request is generated only if said transmission is in selected ones of said plurality of gears.

4. The apparatus of claim 1, wherein the selected fraction is one-half.

5. The apparatus of claim 1, wherein the predetermined number of cylinders is eight.

6. The apparatus of claim 1, wherein the predetermined number of cylinders is twelve.

7. The apparatus of claim 1, wherein said predetermined threshold can be calibrated.

8. The apparatus of claim 1, wherein said vehicle is an automobile.

9. The apparatus of claim 1, wherein said engine is an internal combustion engine.

10. A security method for an electronic fuel control system in an engine of a vehicle having a predetermined number of cylinders, the method comprising the steps of:

generating an increase signal for a throttle of the engine if less than all of the predetermined number of cylinders is requested to be activated;

determining whether a number of the predetermined number of cylinders being activated is equal to or less than the selected fraction;

starting a timer if the number of the predetermined number of cylinders being activated is greater than the selected fraction; and requesting termination of said increase signal if a time measured by said timer exceeds a predetermined threshold.

11. The method of claim 10, further comprising the steps of:

monitoring which gear is being employed by a transmission having a plurality of gears, said transmission being connected to the engine; and providing the increase signal only if said transmission is employing selected ones of said plurality of gears.

12. The method of claim 10, wherein said selected fraction is one-half.

13. The method of claim 10, wherein the predetermined number of cylinders is eight.

14. The method of claim 10, wherein said predetermined threshold can be calibrated.

15. The method of claim 10, wherein said activation of said predetermined number of cylinders comprises fueling.

16. The apparatus of claim 10, wherein the predetermined number of cylinders is twelve.

17. The apparatus of claim 10, wherein said predetermined threshold can be calibrated.

18. The apparatus of claim 10, wherein said vehicle is an automobile.

19. The apparatus of claim 10, wherein said engine is an internal combustion engine.

20. A security apparatus for an electronic fuel control system in an internal combustion engine of an automobile, such security apparatus comprising:

eight cylinders of the engine that are configured for activation and deactivation;

a throttle of the engine that is configured to provide a throttle increase based at least in part upon a deactivation of one or more of the eight cylinders; and an electronic controller that is configured to:

generate an increase signal for said throttle if less eight cylinders are requested to be activated;

determine whether the number of eight cylinders being activated is equal to or less than four;

start timing with a timer if the number of eight cylinders being activated is greater than four; and request termination of said increase signal if the time measured by the timer exceeds a predetermined threshold period.

* * * * *